United States Patent [19]

Kregness

[11] Patent Number: 4,523,210
[45] Date of Patent: Jun. 11, 1985

[54] FAST ERROR CHECKED MULTIBIT MULTIPLIER

[75] Inventor: Glen R. Kregness, Minnetonka, Minn.
[73] Assignee: Sperry Corporation, New York, N.Y.
[21] Appl. No.: 387,644
[22] Filed: Jun. 11, 1982
[51] Int. Cl.[3] ............................................... G06F 7/52
[52] U.S. Cl. ................................. 364/760; 364/738; 364/784
[58] Field of Search ..................... 364/760, 784, 738

[56] References Cited

U.S. PATENT DOCUMENTS

| | | | |
|---|---|---|---|
| 3,730,425 | 5/1973 | Kindell | 364/760 |
| 3,761,699 | 9/1973 | Sather | 364/759 |
| 4,122,527 | 10/1978 | Swiatowiec | 364/760 |
| 4,153,938 | 5/1979 | Ghest et al. | 364/760 |
| 4,228,520 | 10/1980 | Letteney et al. | 364/760 |

OTHER PUBLICATIONS

Larson, "High-Speed Multiply Using Four Input Carry-Save Adder," *IBM Tech. Dis. Bulletin*, vol. 16, No. 7, Dec. 1973, pp. 2053-2054.
Wallace, "A Suggestion for a Fast Multiplier", *IRE Trans. on Electronic Computers*, Feb. 1964, pp. 14–17.
Gosling et al., "Uncommitted Logic Array Which Provides Cost-Effective Multiplication Even for Long Words," *Computers and Digital Techniques*, vol. 2, No. 3, Jun. 1979, pp. 113-120.

Primary Examiner—David H. Malzahn
Attorney, Agent, or Firm—Charles A. Johnson; Kenneth T. Grace; Marshall M. Truex

[57] ABSTRACT

A high speed multiplier circuit is disclosed which not only provides increased performance for the multiply operations of a large scale processor but also provides for single bit error detection of results as well. It incorporates a gated carry/save adder array to eliminate the decoding of multiplier characters thereby reducing logic levels and enhancing performance. A means is illustrated for detecting single bit errors without redundancy or performance loss. While the array proper is more complex than other multibit algorithms, the multiplexers needed by those earlier systems are no longer required. The small increase in complexity of the array proper eliminates the need for decoding of the multiplier bits or other interaction between the multiplier groups. The net effect is a reduction in logic with faster operation because of the omission of the decoding requirement.

3 Claims, 23 Drawing Figures

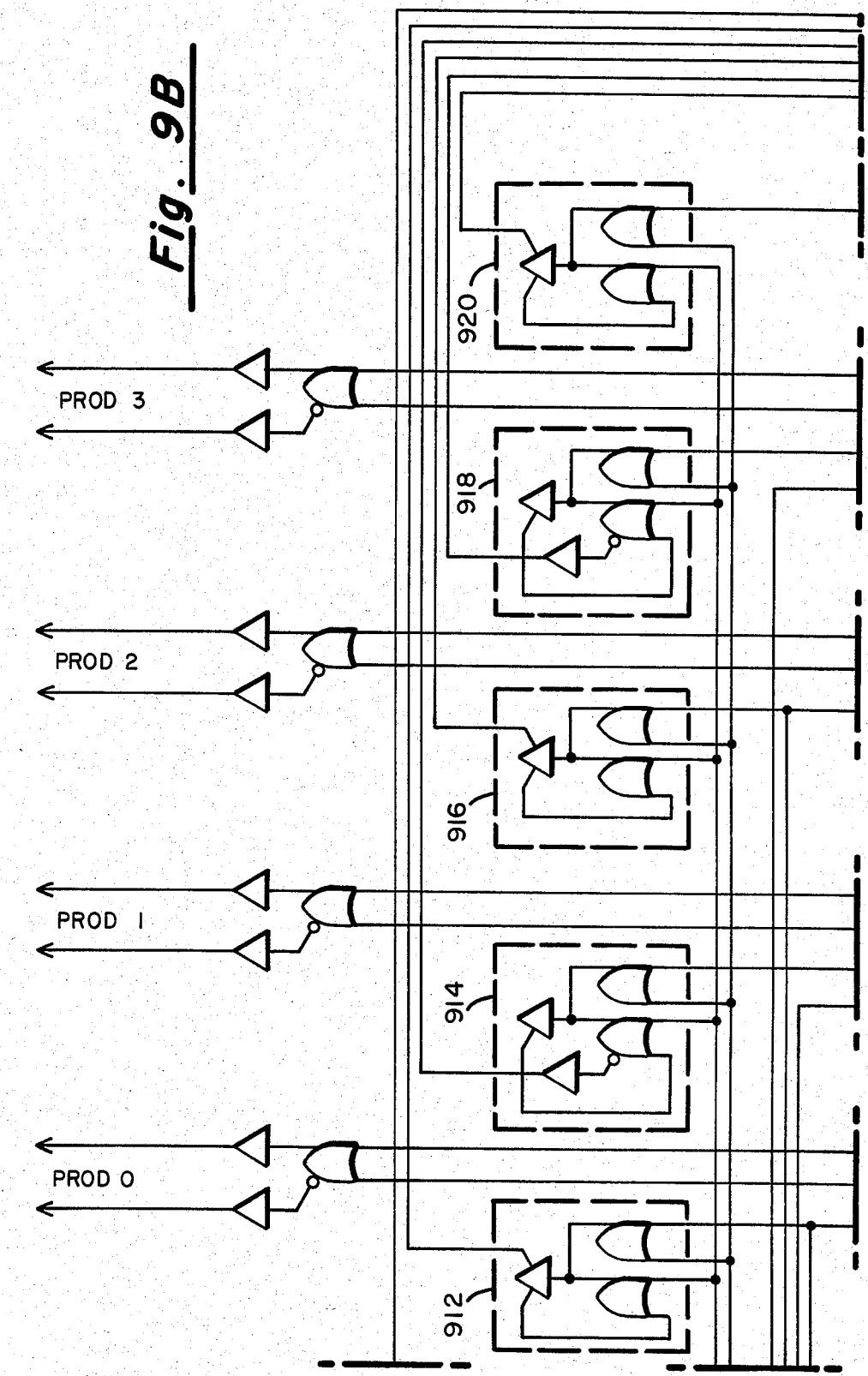

FAST ERROR CHECKED MULTIBIT MULTIPLIER

BACKGROUND OF THE INVENTION

A. Field of the Invention

This invention relates to multibit multipliers such as are used in digital data processing systems. More particularly, it relates to such a multibit multiplier which provides increased performance for the multiply operations of a large scale processor by processing eight multiplier bits per machine clock cycle and also provides for single bit error detection of the results.

B. Prior Art

In the past, multiplication was most often performed in digital data processors by repetitively adding the multiplicand to itself the number of times indicated by the multiplier. As speed increased, this repetitive addition by the machines adder gave way to the use of individual multiplier circuits. Today, most contemporary large scale processors utilize specialized networks to accomplish faster multiply operations. These networks are designed to simultaneously process several multiplier bits. Further, a number of specialized algorithms have been developed to simplify the logic used in the building of these arrays. Generally, this simplification involves the decoding of multiplier groups and interaction between the multiplier groups to control the array.

This approach, of course, complicates the control aspect, while simplifying the array. Such arrays are commonly built of a combination of adders and multiplexers, with multiplier decoders used for control. The adders used may be of the conventional type or they may take the carry/save form.

Another common feature in past digital data processors has been the inclusion of error detecting networks in all data paths of the machine. However, present day large scale integrated (LSI) devices do not provide for the inclusion of these error detecting networks in the usual manner. This leaves duplication and result comparison as the only available method of error detection for these LSI devices.

One specific earlier example of a fast multiplier was suggested in the article published in *IEEE TRANSACTIONS ON ELECTRONIC COMPUTERS* in an article by C. S. Wallace, entitled "A Suggestion for a Fast Multiplier", on pages 14–17 of the February, 1964 issue. The article suggests that the economics of large scale scientific computers of that day could benefit from greater investment in hardware to mechanize multiplication that was common in computers of a still earlier vintage.

Multiplication of binary fractions is normally implemented as the addition of a number of summands, each some simple multiple of the multiplicand, chosen from a limited set of available multiples on the basis of one or more multiplier digits. No good reason is known to depart from this general scheme. Acceleration of the process must then be based on one or more of the following expedients: (1) reduction in the number of summands; (2) acceleration of the formation of summands; (3) acceleration of the addition of summands. Acceleration of addition will be discussed initially.

The basic addition processes usually employed in computers add two numbers together. The possibility exists of adding together more than two numbers in a single adder to produce a single sum. However, the logical complexity of the adder required appears to grow quite disproportionately to the resulting increase in speed, consequently there appears to be no advantage in trying to sum even three numbers at a time into a single sum.

Another expedient, now quite commonly used, is to employ a pseudoadder which adds together three numbers, but rather than producing a single sum, produces two numbers whose sum equals that of the original three. In the context of the basic problem of adding together many summands, one pass through such an adder reduces the number of summands left to be summed by one, as does a pass through such an adder reduces the number of summands left to be summed by one, as does a pass through a conventional adder. The advantage of the pseudoadder is that it can operate without carry propagation along its digital stages and hence is much faster than the conventional adder. A simple form for such an adder is a string of full adder circuits of the normal sort, where the carry inputs are used for the third input number, and the carry outputs for the second output number. In multiplication, one pseudoadder is usually used, and storage is provided for two numbers. On each pass through the adder, the two stored numbers and one multiple of the multiplicand are added, and the resulting two numbers returned to storage.

In any scheme employing pseudoadders, the number of adder passes occurring in a multiplication before the product is reduced to the sum of two numbers, will be two less than the number of summands, since each pass through an adder converts three numbers to two, reducing the count of numbers by one. To improve the speed of the multiplication, one must arrange many of these passes to occur simultaneously by providing several pseudoadders.

Assuming that all summands are generated simultaneously, the best possible first step is to group the summands into threes, and introduce each group into its own pseudoadder, thus reducing the count of numbers by a factor of 1.5 (or a little less, if the number of summands is not a multiple of three). The best possible second step is to group the numbers resulting from the first step into threes and again add each group in its own pseudoadder. By continuing such steps until only two numbers remain, the addition is completed in a time proportional to the logarithm of the number of summands.

Successive steps may use the same set of pseudoadders (using progressively fewer of the set in each step) by using temporary storage registers for the outputs of the pseudoadders. However, if we used separate adders the equipment cost is little if at all increased, since the additional pseudoadders required will not need many more components than the flip-flop registers eliminated, and the control circuitry is greatly simplified. Further consideration of this approach will reveal that the purely combinational adder would have a considerable speed advantage. In the simplest form of multiplication, there are as many summands as multiplier digits, each either 0 or 1 times the multiplicand. A wide range of schemes involving recoding the multiplier into a new (possibly redundant) form using some negative digits have been developed to reduce the number of summands. Since all summands are to be generated simultaneously, and then summed very quickly, it is desirable that the recoding scheme used should (1) require only multiples of the multiplicand obtainable by shifting and complementing, and (2) be a local recoding in which each recoded digit depends only on a small group of original multiplier digits. The best system found gives base-four recoded multiplier digits which can be +2, +1,0, −1 or −2. and each is determined entirely by three adjacent original binary multiplier digits. Considering the process as a base-four recoding, digits 0, 1, 2, 3 are recoded into digits 0, 1, −2. −1, respectively, if the next less significant original base-four digit is 0 or 1, and into 1, 2, −1. 0 if the next less significant original digit is 2 or 3. The number of summands is half the number of binary multiplier digits. Attempts to reduce the number further appear to require multiples not obtainable by shifting. Some complications arise in the pseudoadder structure because of the negative multiplier digits, which, in a two's complement system, require correction digits to be added in. However, detailed examination shows that these problems are surmountable without loss of speed or undue circuit cost.

Additional schemes for parallel multipliers which are based on different principles and having some advantages over those presented above by C. S. Wallace, have been proposed by L. Dadda in his article entitled *Some Schemes for Parallel Adders* published in "Alta Frequenza" in March 1965 at pages 349 to 356.

In his conclusions, Mr. L. Dadda suggests that having established the possibility of a parallel digital multiplier, some considerations can now be made about the important aspects of speed and cost than can be encountered in a practical design.

He suggests that if one assumes that a third of all arithmetic operations in scientific computers are multiplications and that these at present take about four times as long as additions, the use of a fast multiplier allowing a multiplication in a memory cycle time, would approximately double the speed of computation.

There is therefore a chance that a parallel multiplier could become a convenient means to improve the value of a computer, owing to the fact that it's cost can be shown to be only a few percent of the total computer cost.

Let us first note that the total multiplication time is composed of two parts: the first is the time elapsed from the application of the signals representing the two factors to the inputs of the multiplier, to the availability of the inputs to the carry-propagating adder; the second part is the delay proper of the adder, mainly consisting in the carry propagation delay.

In the design of a practical multiplier, one can assume as a goal to obtain a total delay equal or less than the cycle time of the high-speed memory, so that the computer can work at its maximum speed, limited only by the memory speed. The choice of the type of circuits depends therefore on the memory cycle time of present day computers. The increasing use of large scale integration appears to suggest it as the prime path for multipliers as well.

Among the different type of full adders, the most suitable for the application in parallel multipliers, from the point of view of economy and speed, are those which require input variables of one form only (natural or complemented), so that output variables of the same form only must be generated. If such condition is satisfied, outputs of one stage can be used directly as inputs to the nest stages, without the need of inverters, leading in general to a considerable saving in components and to a reduction of stage delay.

It must be noted that the above restriction can be partially released by allowing the use of counters producing outputs of only one form but different from the input's form.

Even though it is well known, indeed, that many important features of today's fast computers depend on the fact that during operations that last longer than one memory cycle (typically, during multiplication or division) memory can be made available for other operations (e.g. input-output) it is still desirable to process in parallel. Thus, a unique approach for the construction of an LSI multiplier will now be described which processes multiple bits in a single machine clock cycle.

BRIEF DESCRIPTION OF THE INVENTION

A. Objects

Accordingly it is an object of this invention to provide an improved multiplier network for use in a large scale digital data processing system.

It is another object of this invention to provide a multiplier network whose increased performance is accomplished by processing eight bits per machine clock cycle.

It is still another object of this invention to provide a multiplier network which is created using large scale integrated circuit techniques.

It is a further object of this invention to provide a large scale integrated circuit multiplier which uses single bit error detection of results without redundancy or performance loss.

It is another object of this invention to provide a multiplier network which requires no decoding of multiplier bits.

It is also an object of this invention to provide a multiplier network which incorporates a gated carry/save adder array to eliminate the decoding of multiplier characters thereby reducing logic levels and enhancing performance.

It is a still further object of this invention to provide a large scale integrated multiplier system which eliminates multiplier decoding without significant increase in array complexity and which incorporates parity thru checking. It also may be implemented as a full matrix design or operated in an iterative manner processing four multiplier digits per step.

B. Summary of the Invention

One of the primary features of this multiplier array resides in the use of the gated carry/save network. Through the utilization of this gated carry/save network, the need for the decoding of multiplier bits is eliminated. While the array proper is more complex than other multibit algorithms, the multiplexers, required by other systems, are also dispensed with. In addition, interaction between multiplier groups is no longer required. The net effect is a reduction in logic with faster operation because of the elimination of the decoding. Error detection is also accomplished in this embodiment. Finally, the carry/save adder is not limited to four bits per step as illustrated, but as high as nine bits per step is a practical goal.

BRIEF DESCRIPTION OF THE SEVERAL FIGURES OF DRAWING

The foregoing objects and the summary will be more readily understood when read in conjunction with the accompanying drawings in which.

Figure 3A:
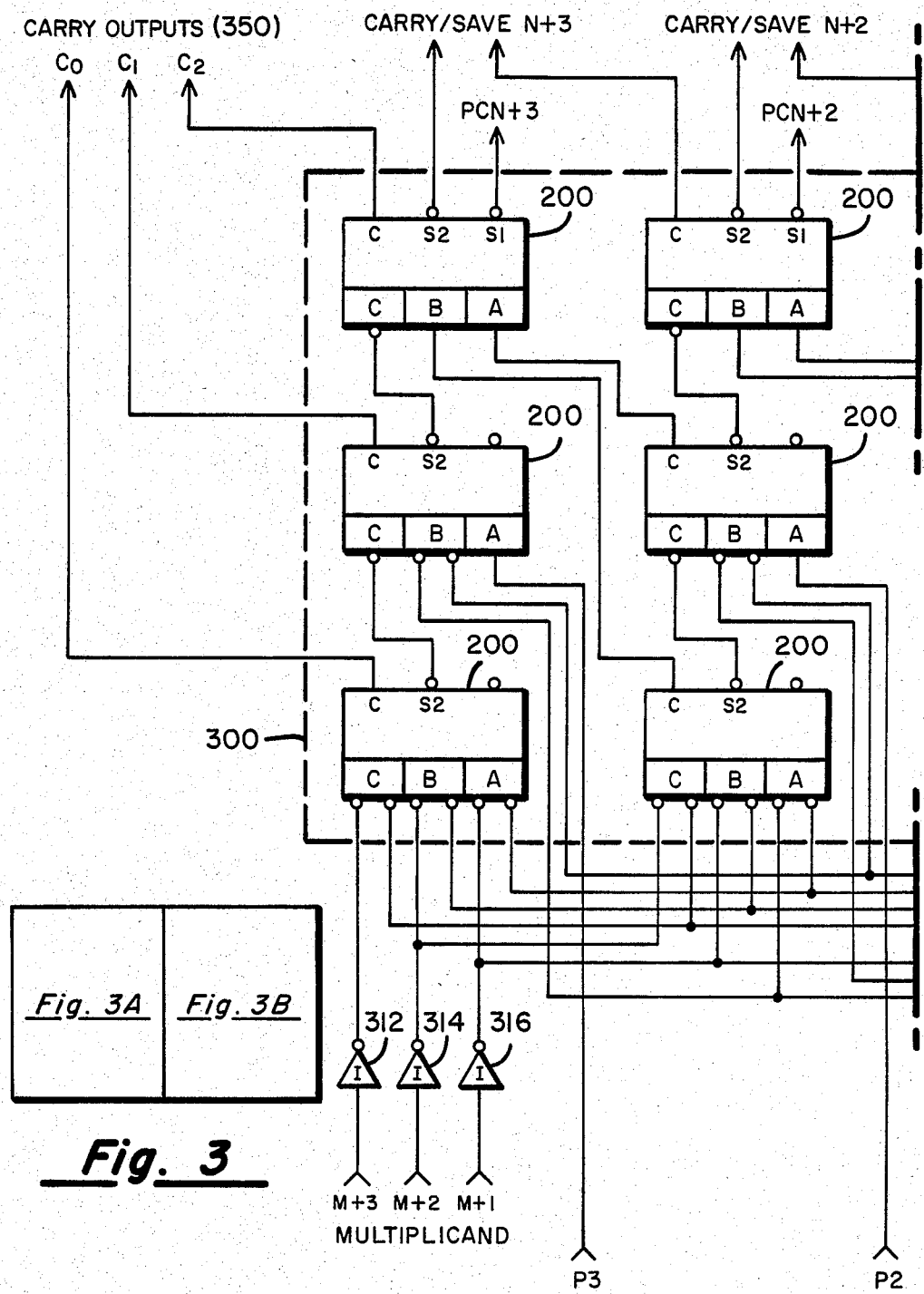
Figure 3B:
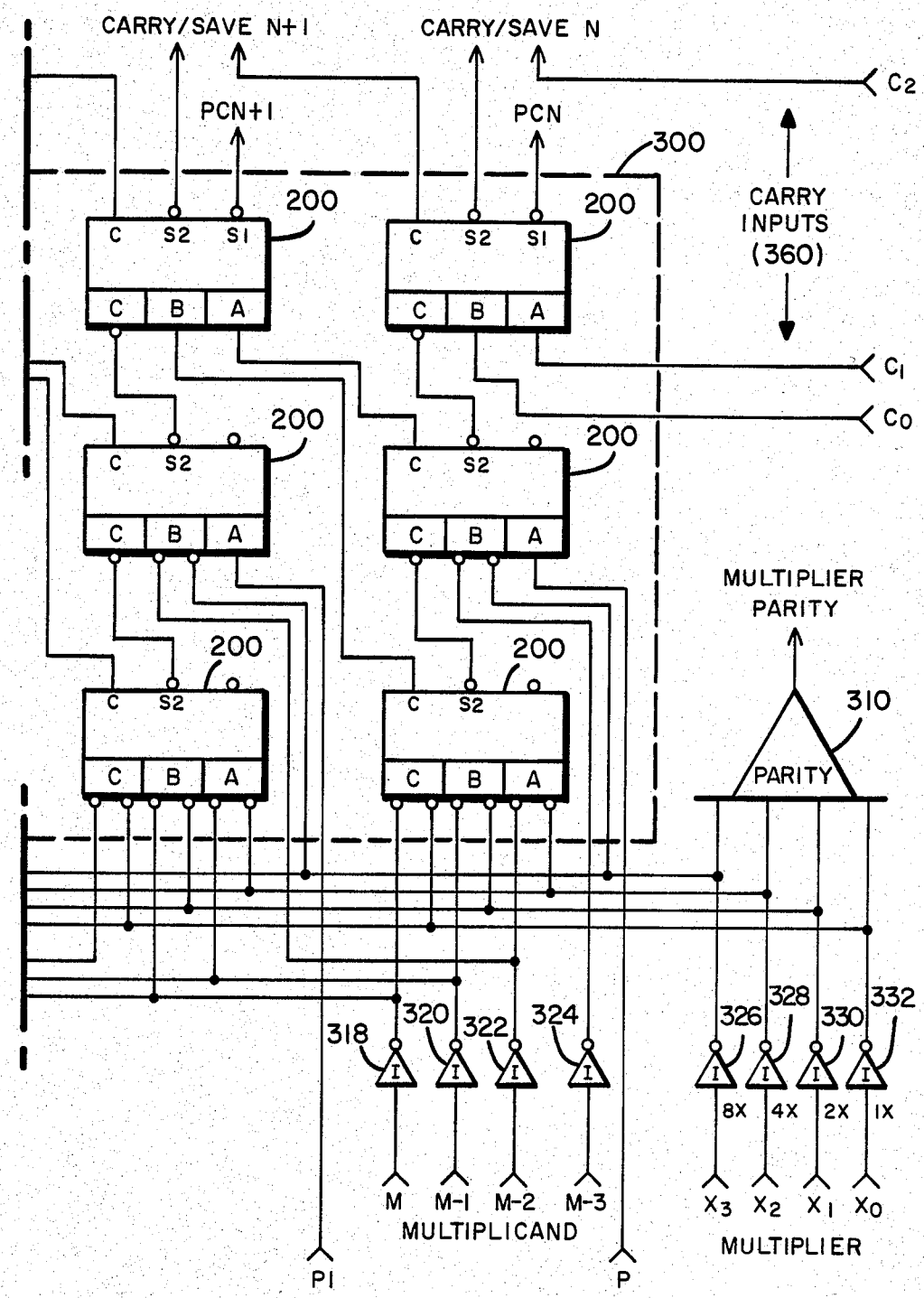

FIG. 3 includes FIG. 3A and FIG. 3B positioned as shown, and diagrams the array interconnect.

Figure 4:
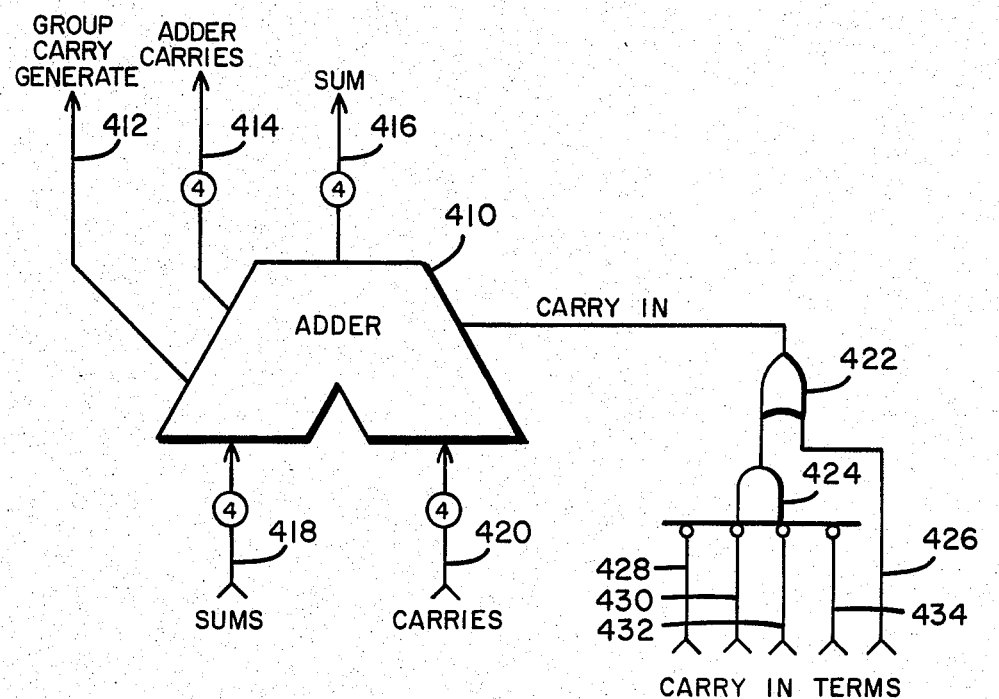

FIG. 4 presents the full adder which sums together the logical sum and carry terms of the carry/save network to produce a four bit product and a single carry term.

Figure 5:
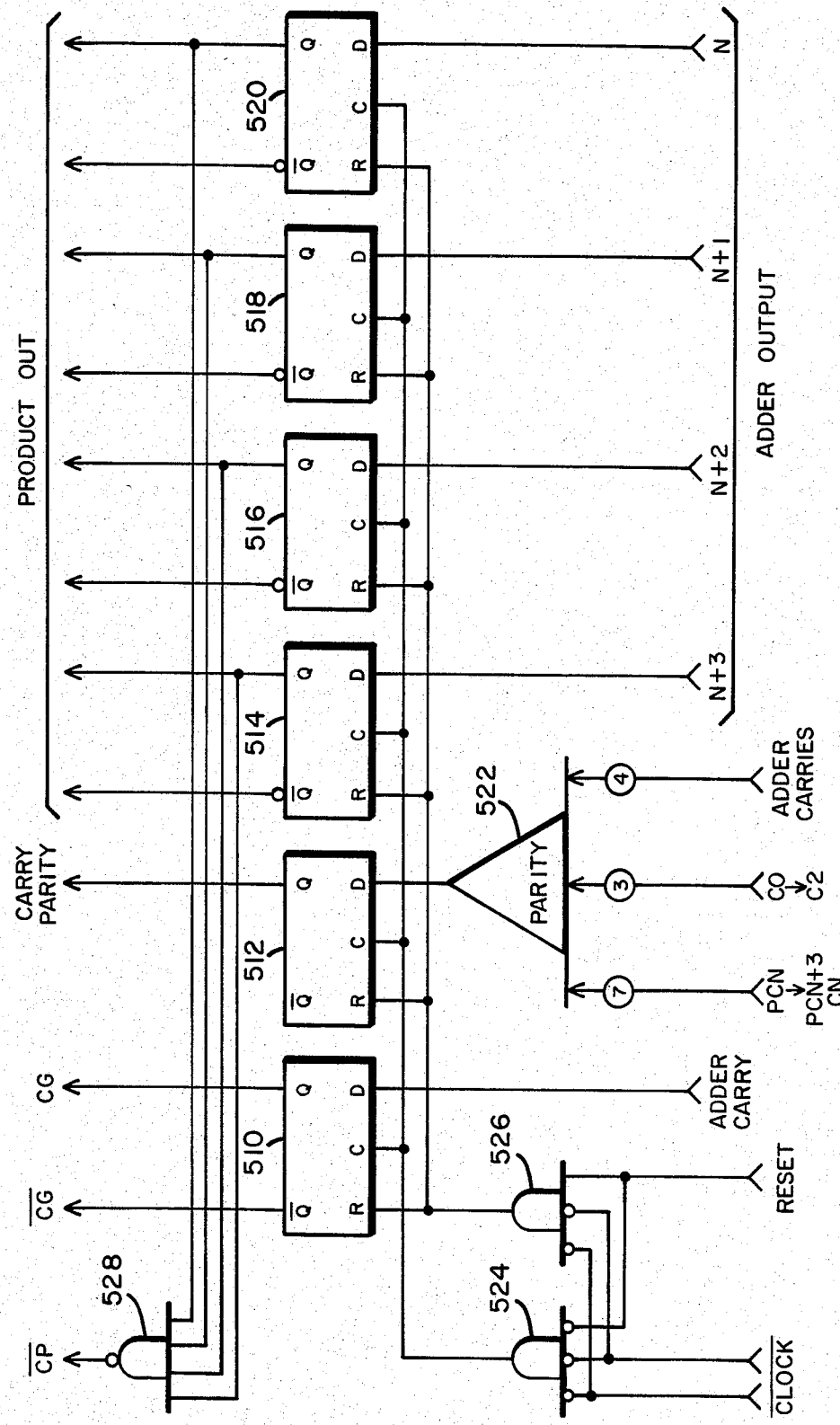

FIG. 5 is the product latch logic which captures the product, carry out and carry parity term.

Figure 6:
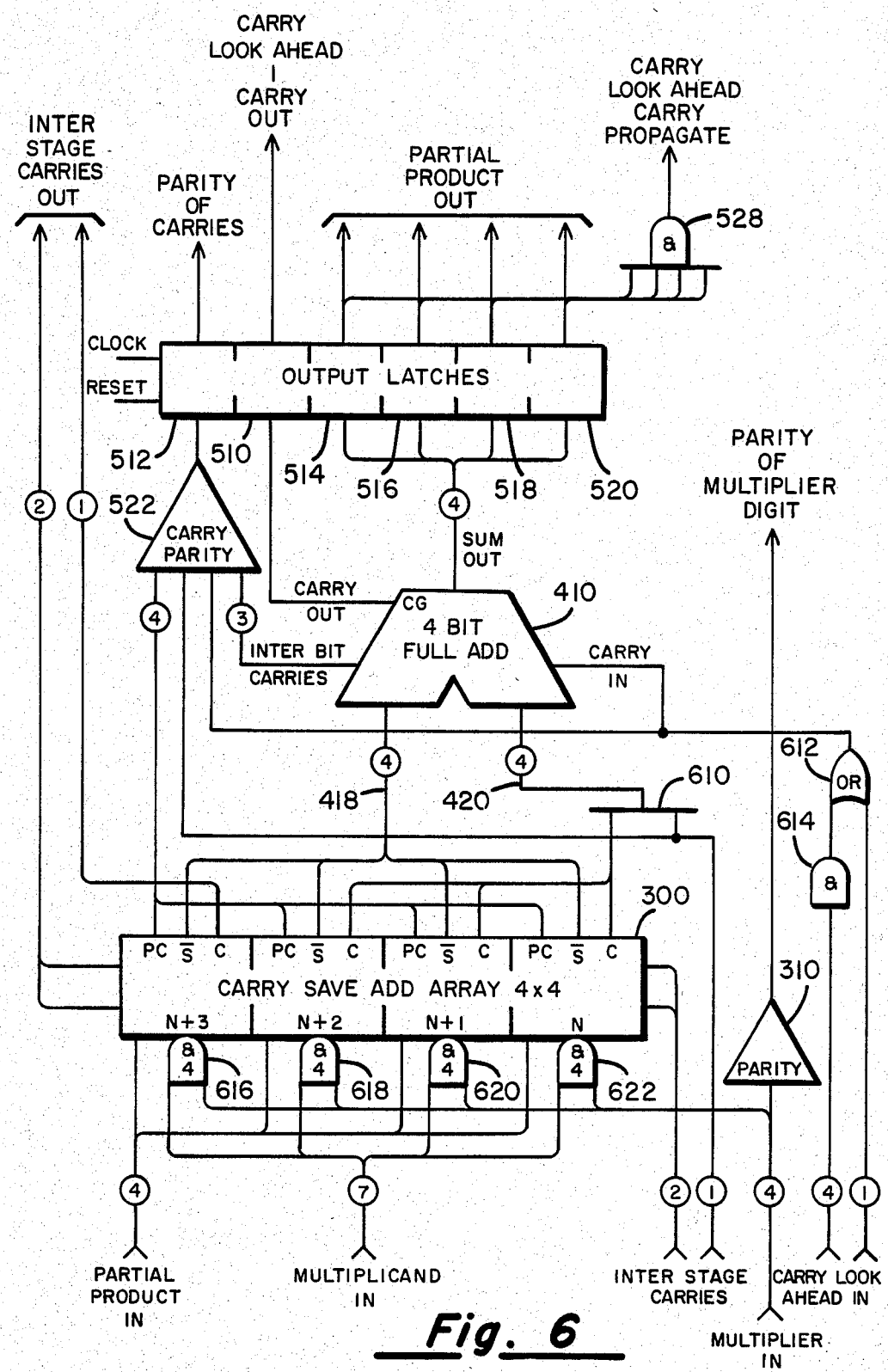
Figure 7A:
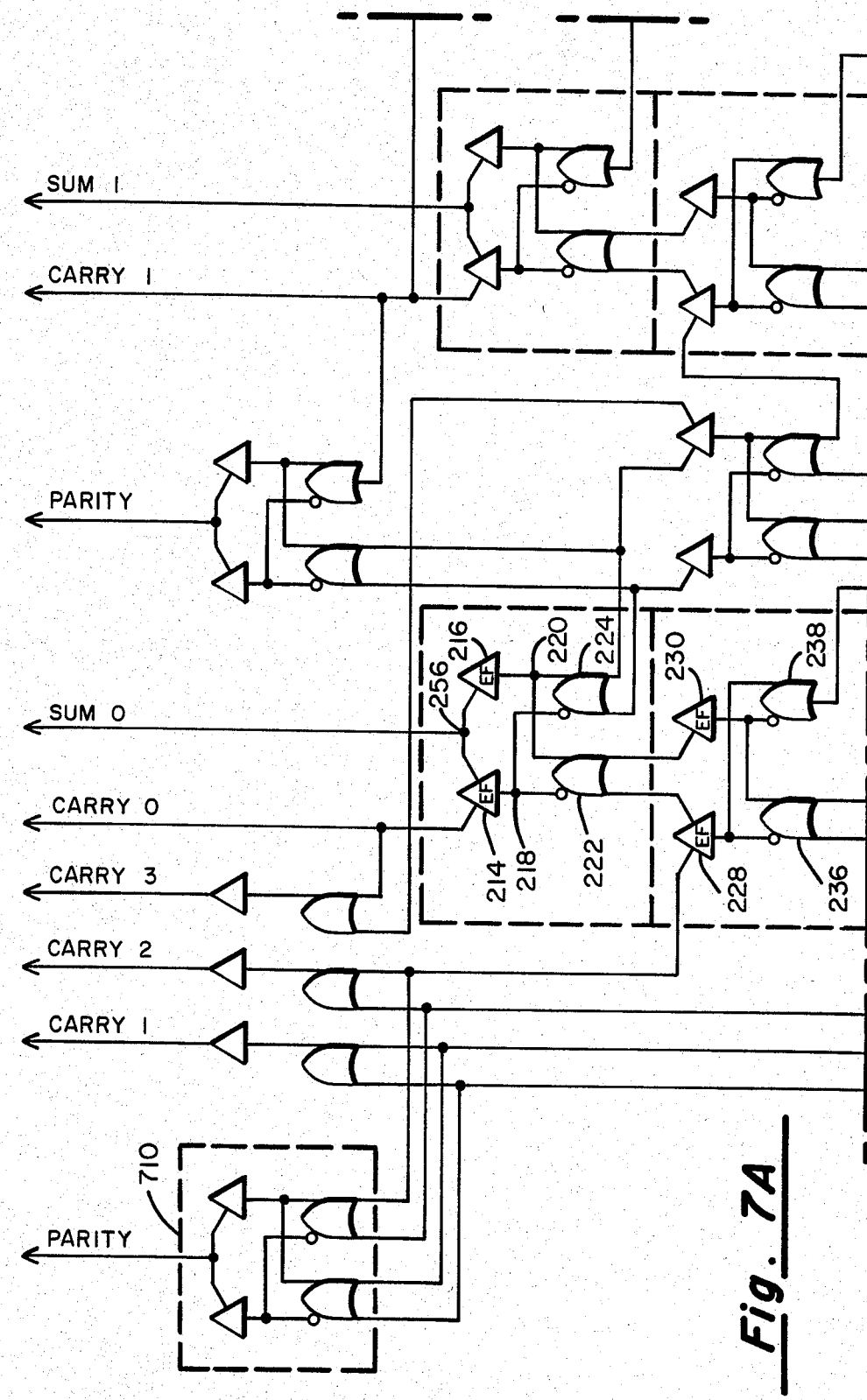
Figure 7B:
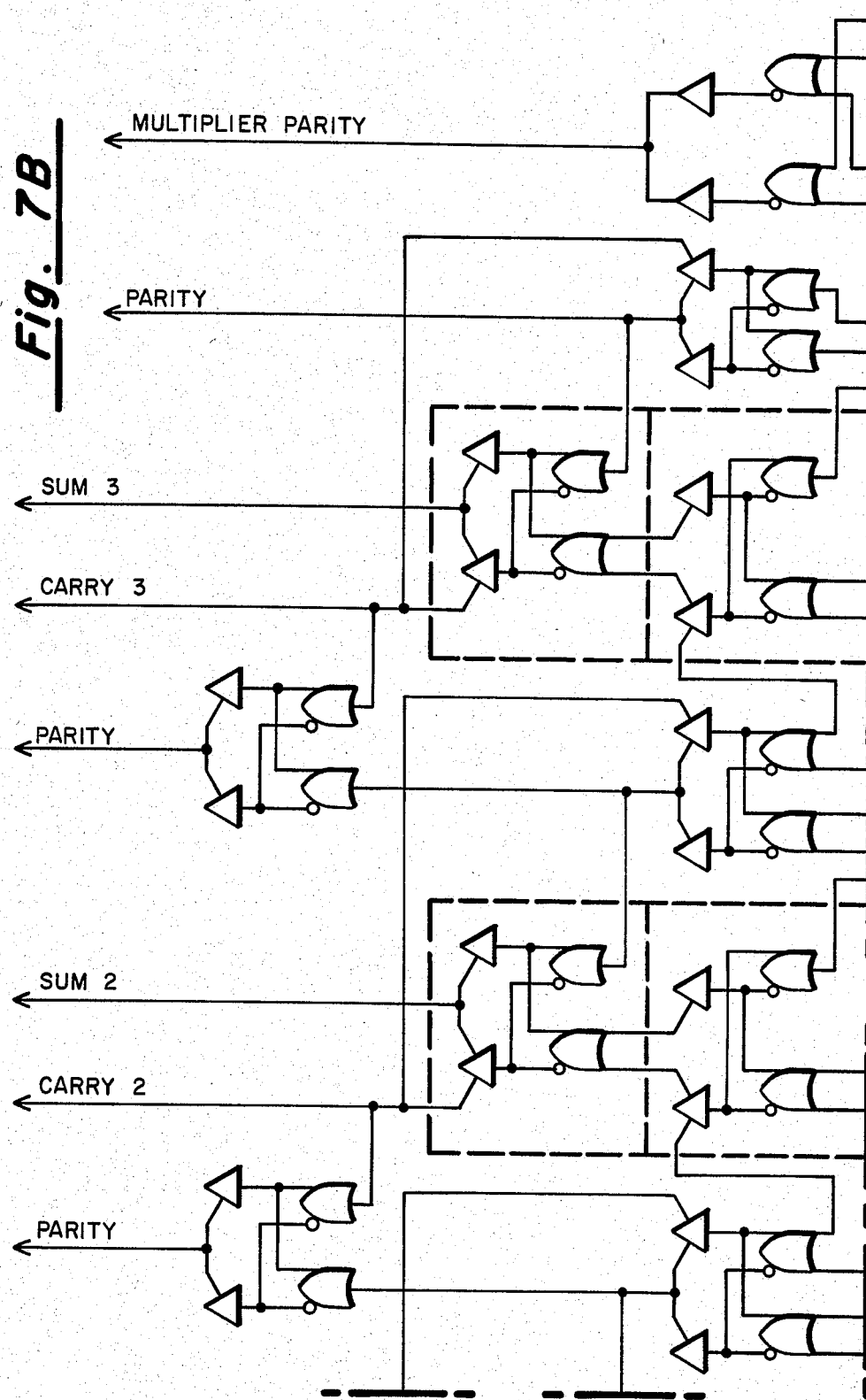
Figure 7C:
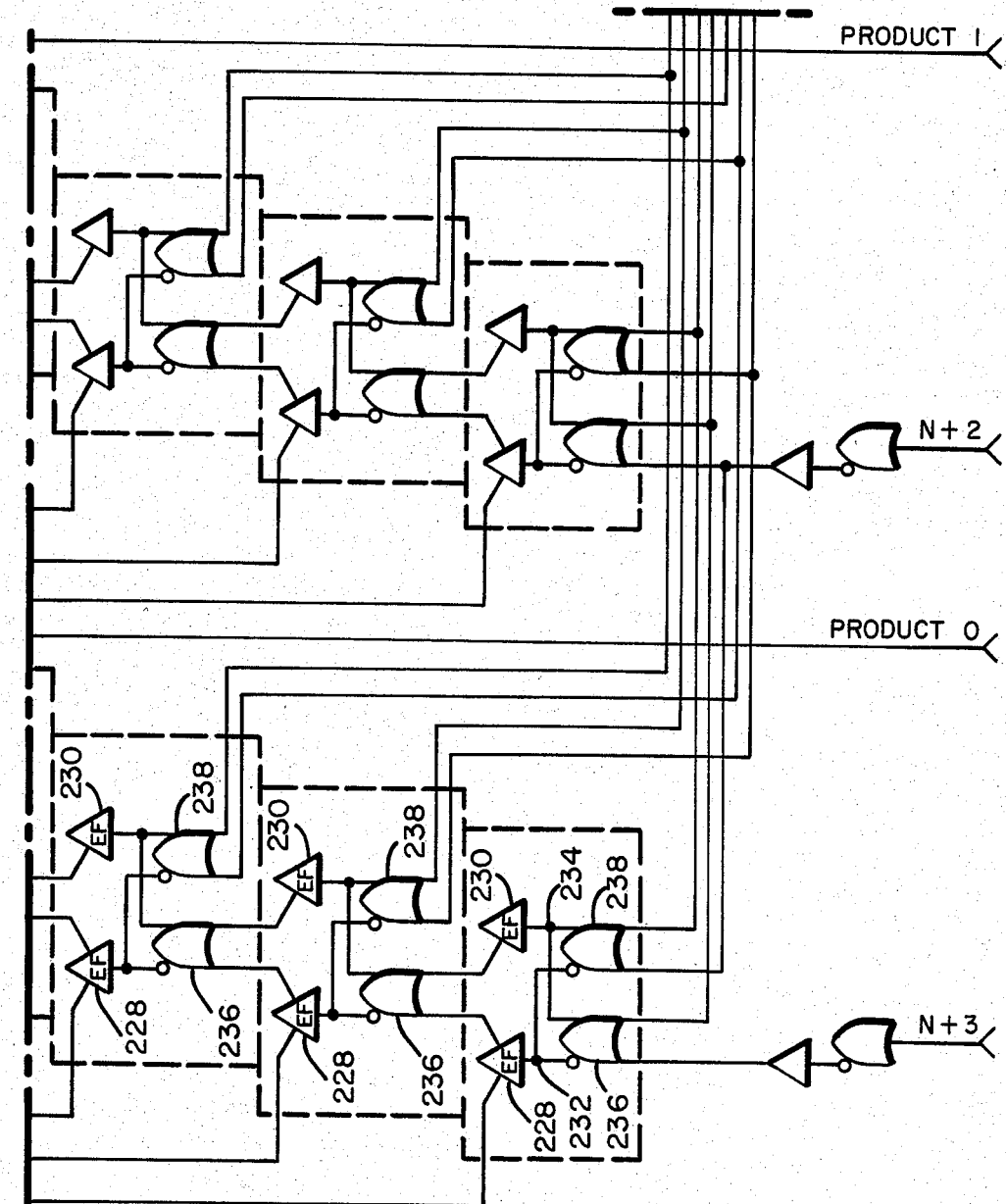
Figure 7D:
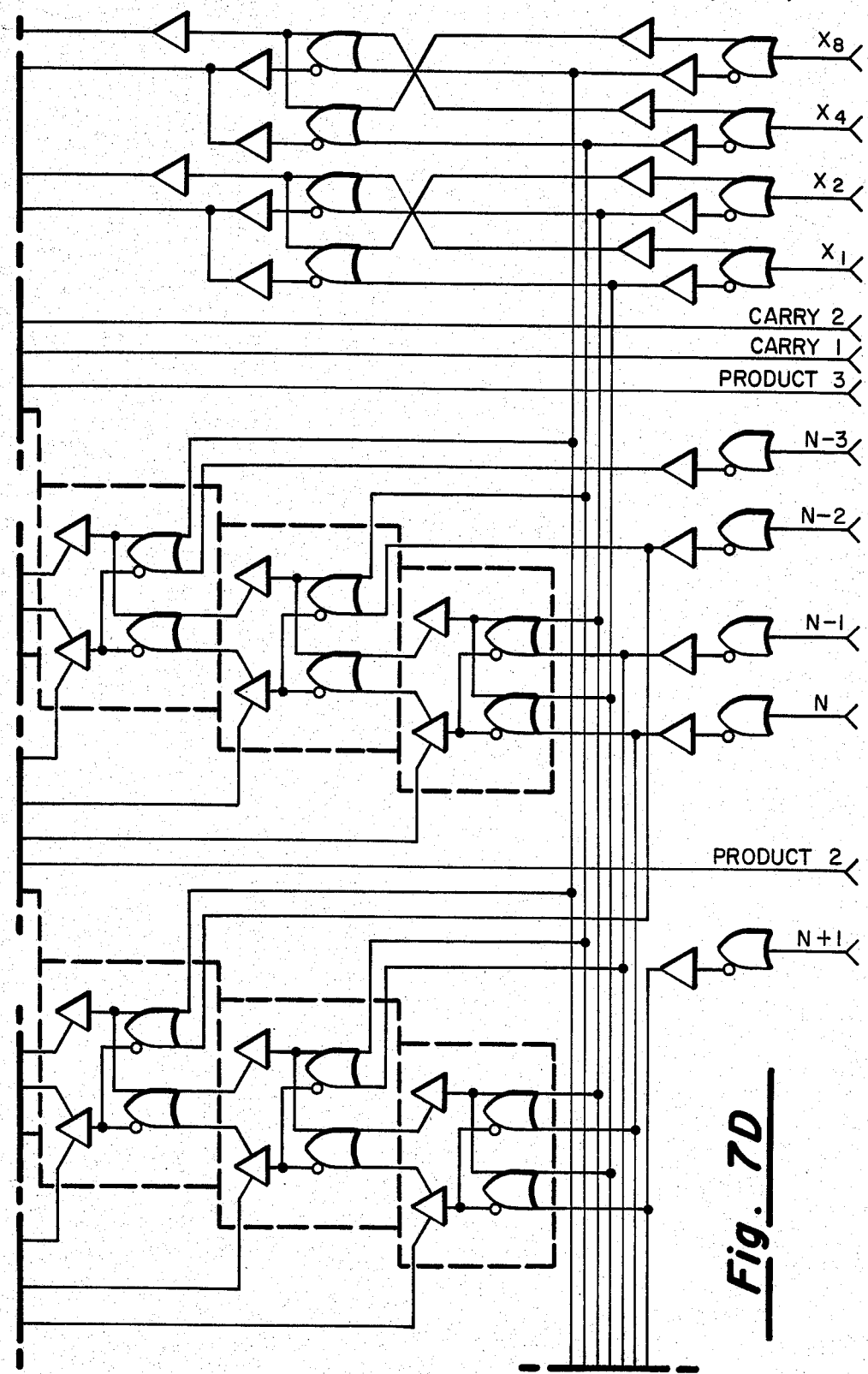

FIG. 6 is a simplified logic diagram illustrating the interconnection of the entire multiplier of this invention.

Figure 7:
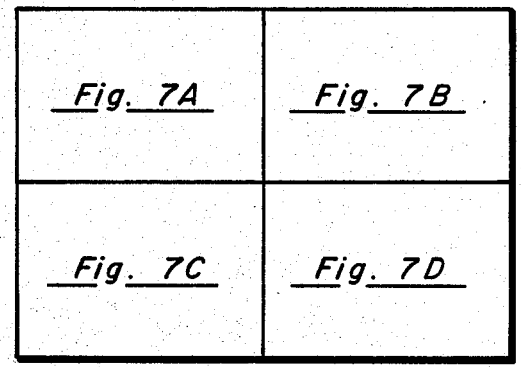

FIG. 7 includes FIG. 7A, FIG. 7B, FIG. 7C and FIG. 7D, which taken together, demonstrate the detailed logic circuits and the respective interconnections of the carry/save multiplier array.

Figures 8, 8A:
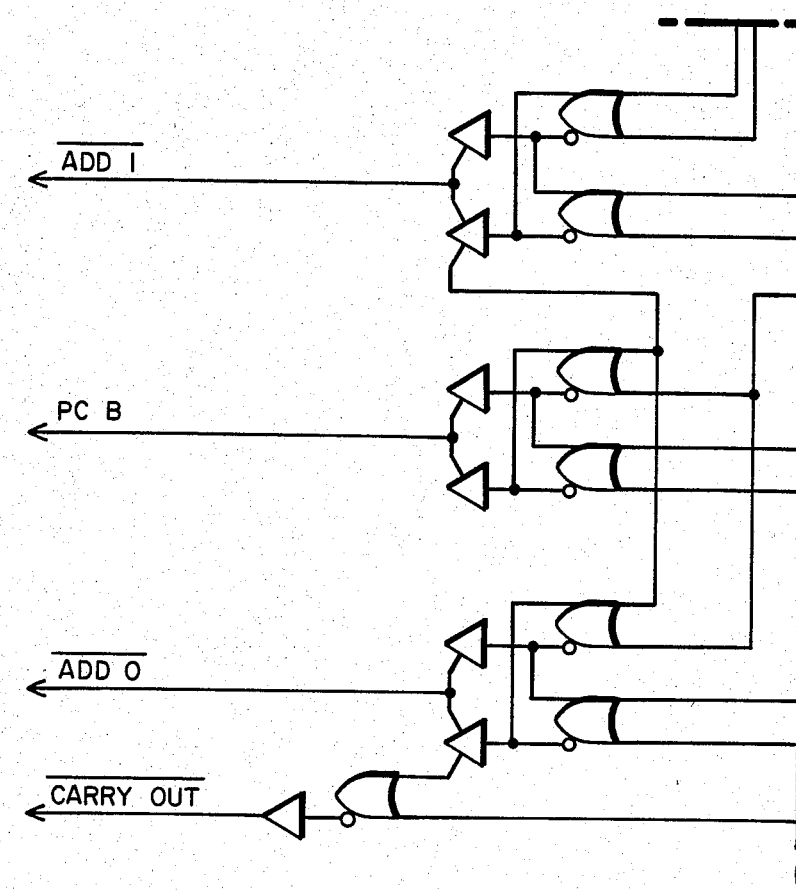
Figure 8B:
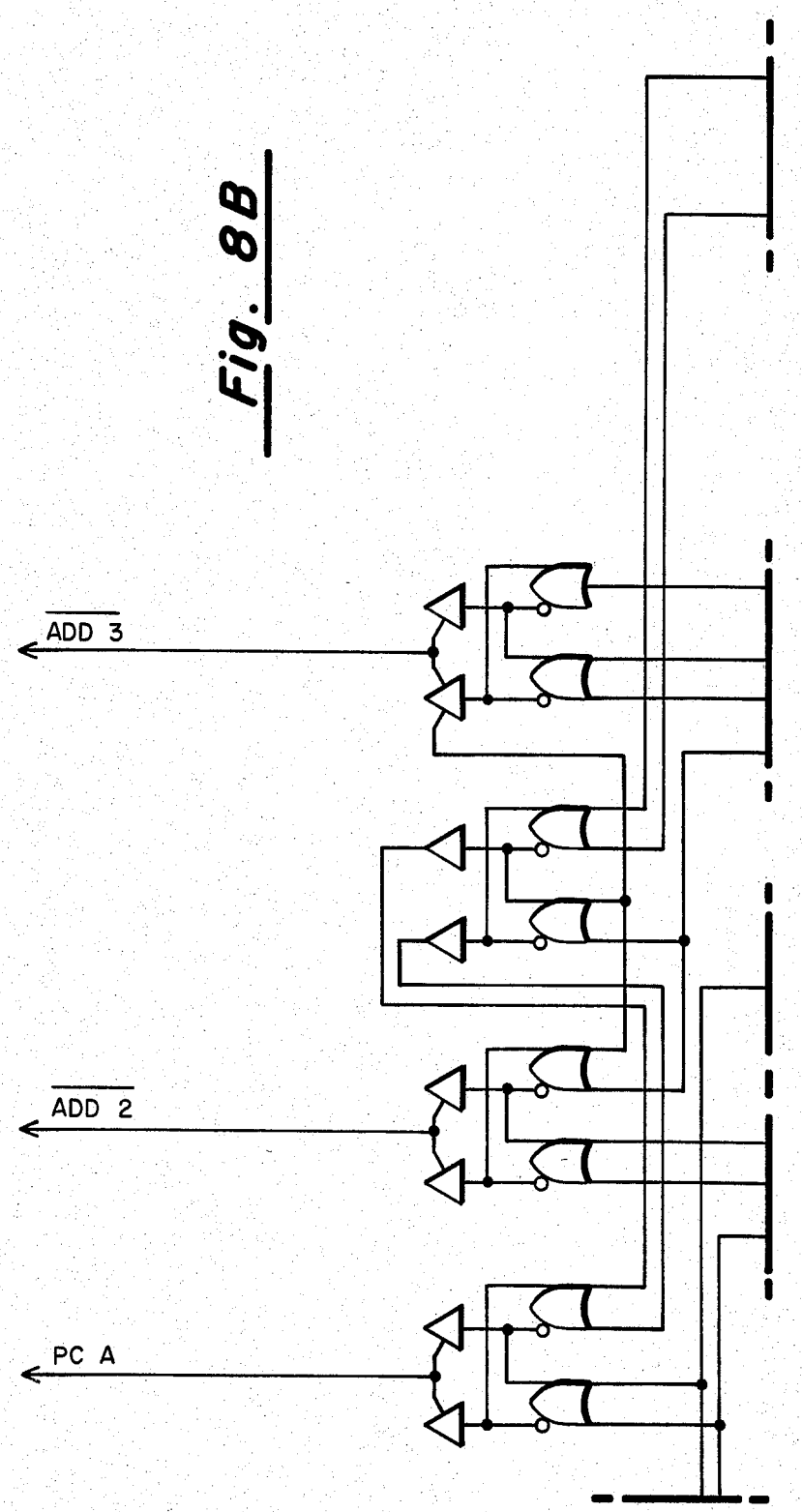
Figure 8C:
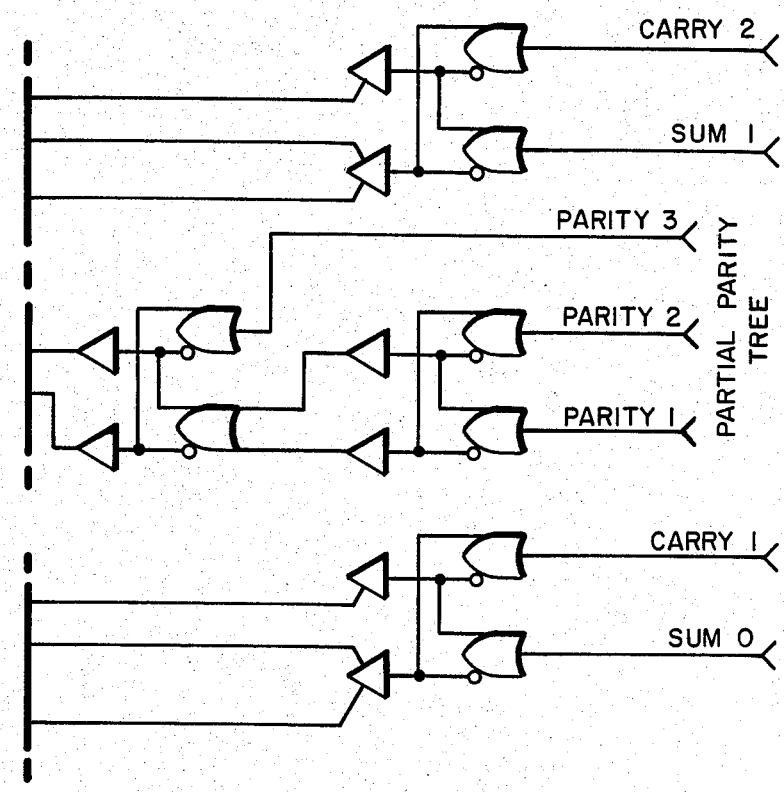
Figure 8D:
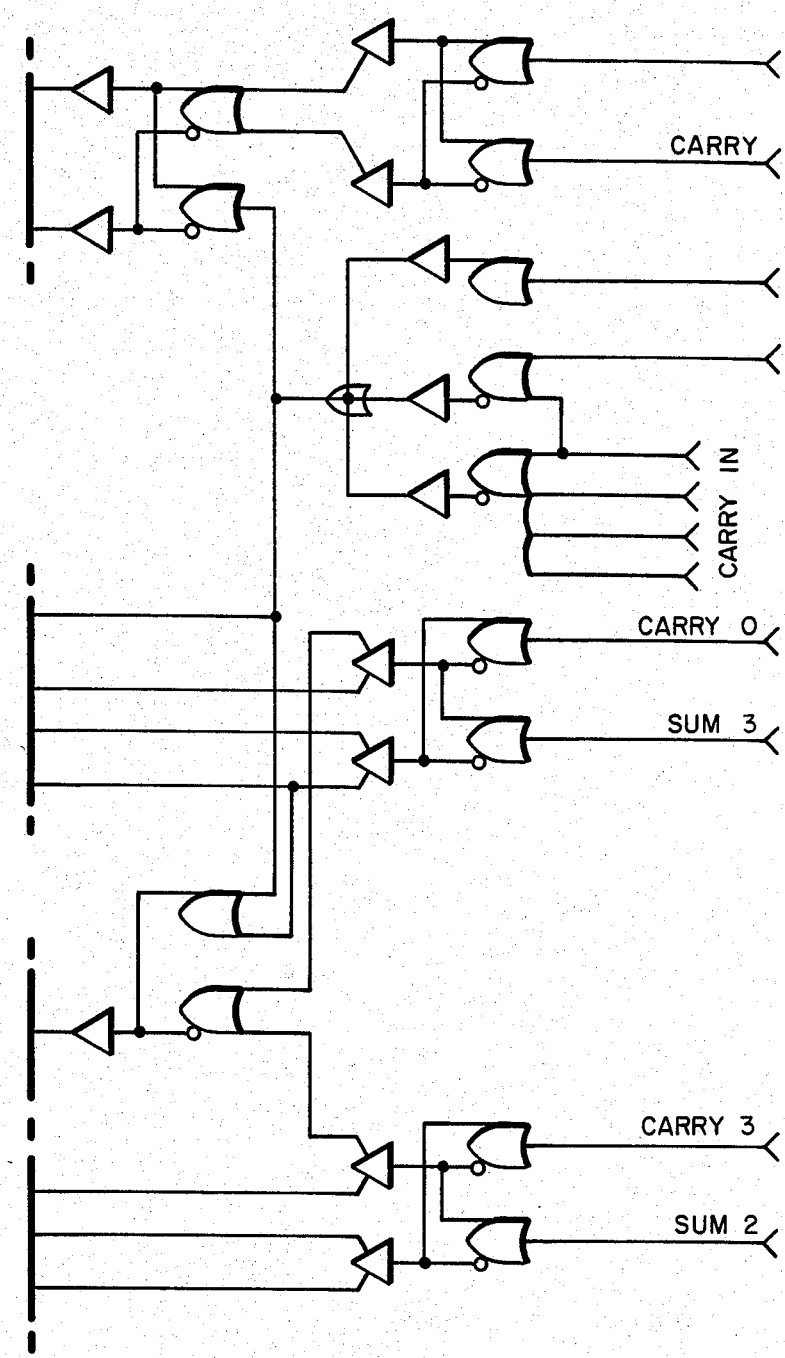

FIG. 8 includes FIG. 8A, FIG. 8B, FIG. 8C and FIG. 8D, which taken together, illustrate the detailed logic of the adder circuit showing the partial parity tree and the carry in signals.

Figure 9A:
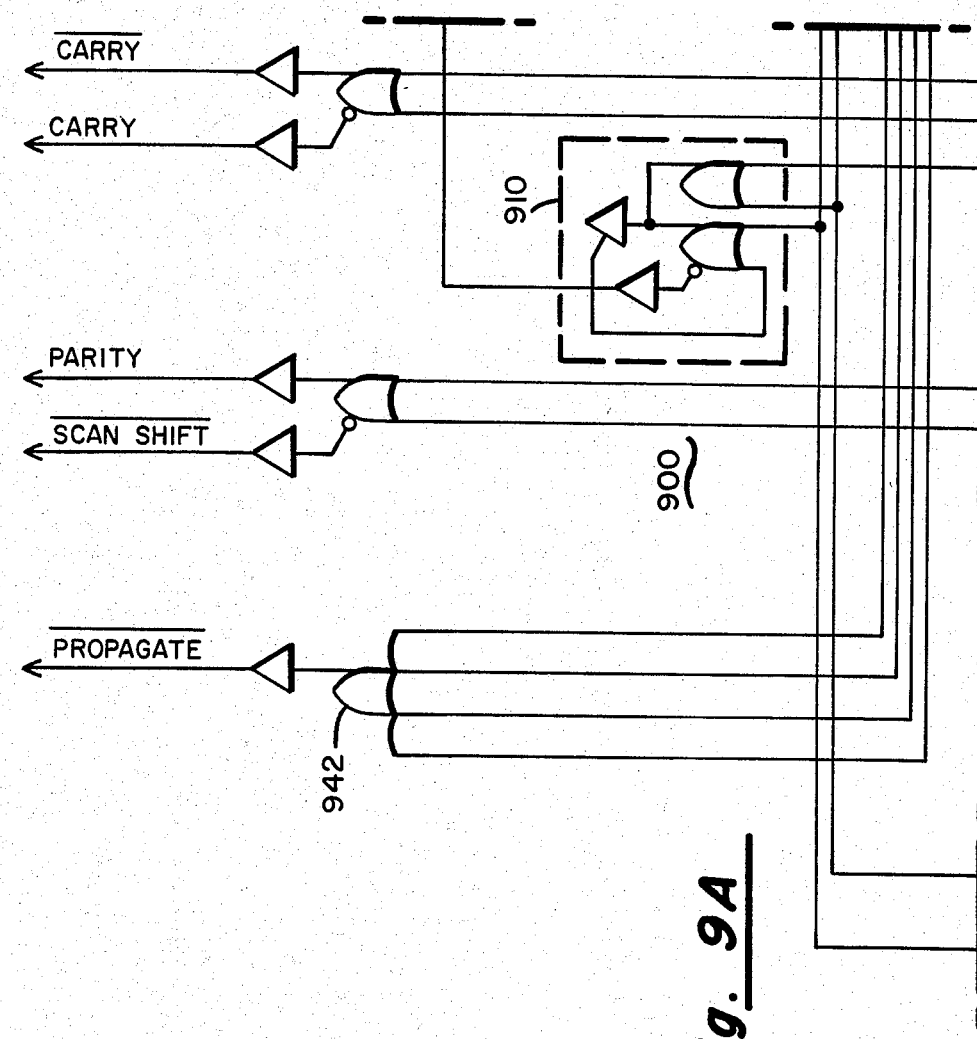
Figure 9:
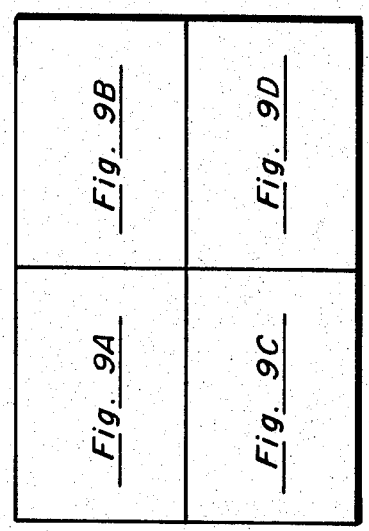
Figure 9C:
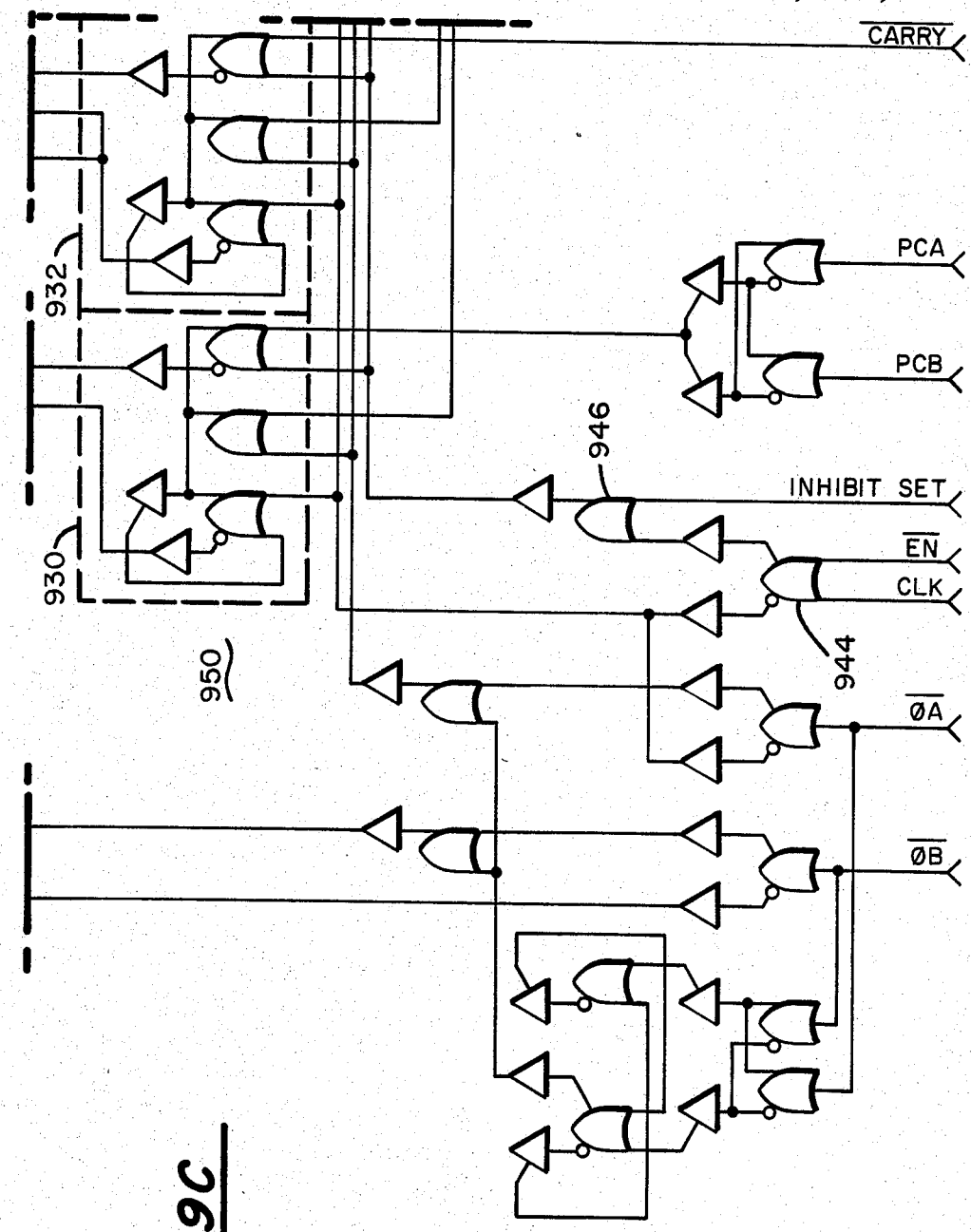
Figure 9D:
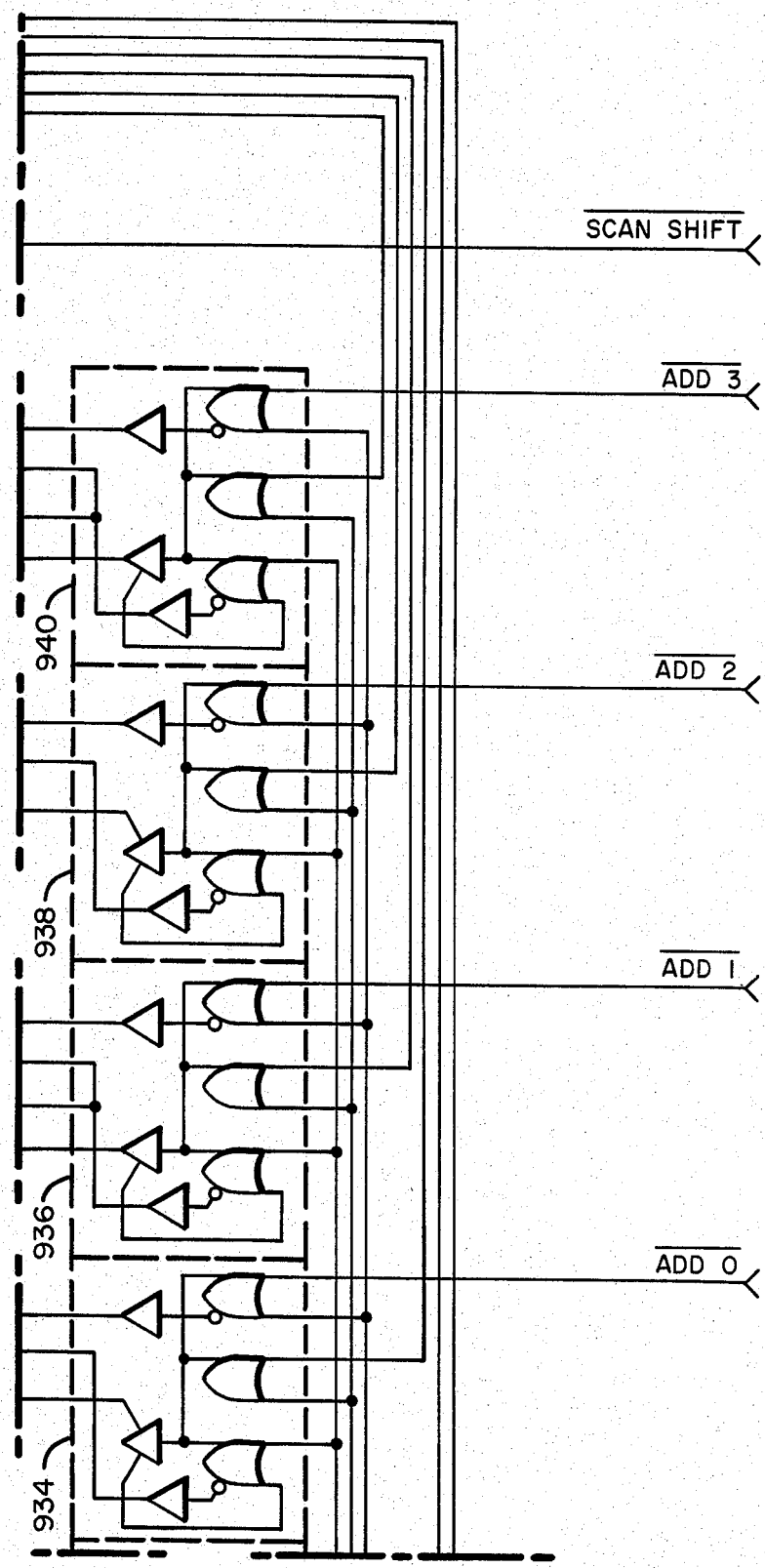

FIG. 9 includes FIG. 9A, FIG. 9B, FIG. 9C and FIG. 9D, which taken together, illustrate the detailed logic of the latch circuits of the register network.

DETAILED DESCRIPTION OF THE INVENTION

The following detailed description will be more easily comprehended when it is read with reference to the foregoing drawings in which like reference characters symbolize corresponding parts.

Figure 1:
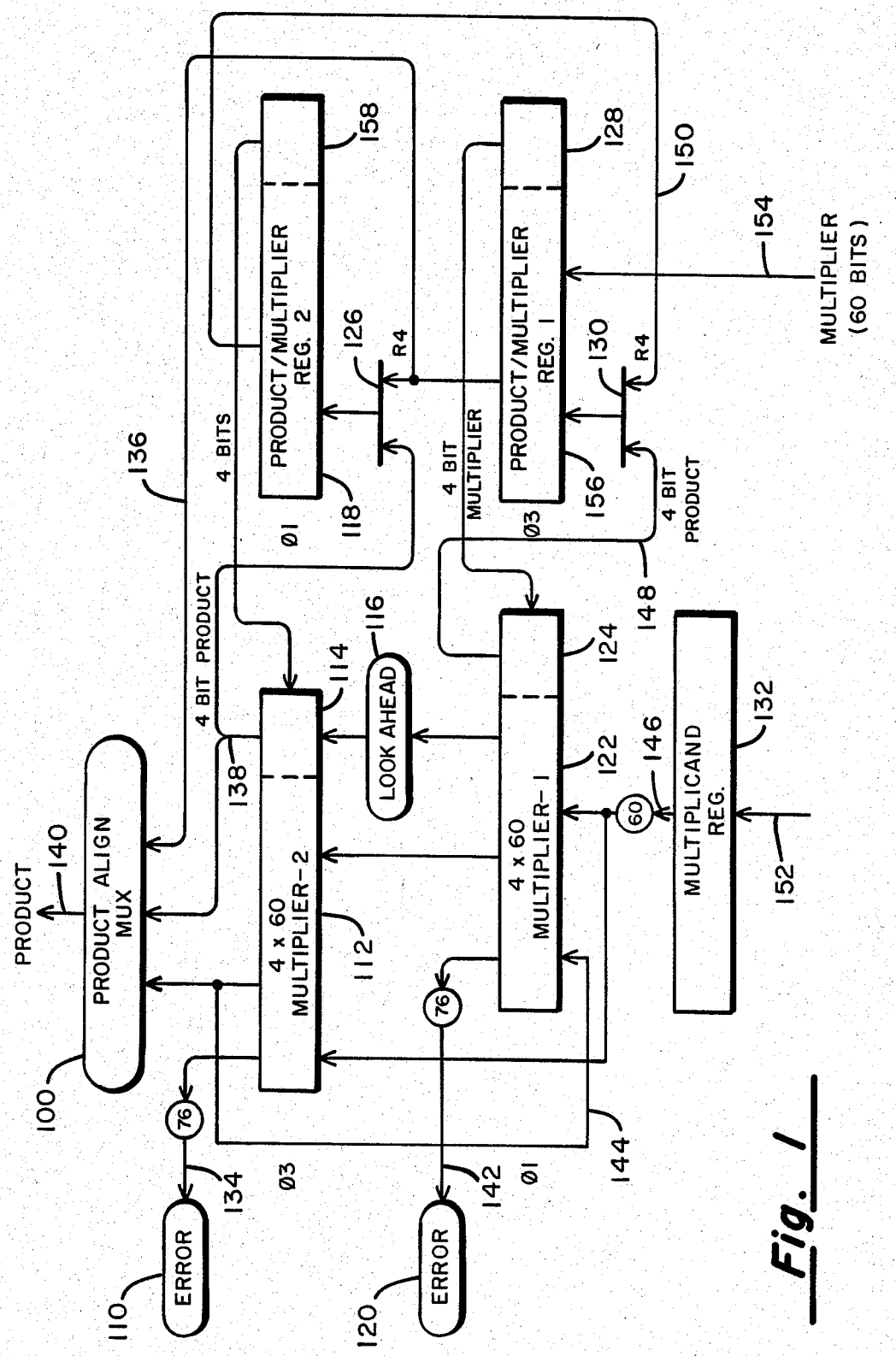
FIG. 1 illustrates the multiplier block diagram of the array implementation.

FIG. 1 is a block diagram of the array implementation. The array design combines a five input gated carry/save adder array with a conventional adder to produce a partial product. Four bits of the multiplier 114, 124, 128, 158 are used to produce the summing of 1X, 2X, 4X and 8X the multiplicand which is further summed with a previously formed partial product. No decoding of the multiplier digits is required, each bit controlling the gating of it's respective power of two times the multiplicand. Array design is slanted toward LSI implementation in a gate array structure and partitioning of the array is in fourbit wide slices to produce a 4×4 multiplier array chip. The partial product is latched on the output and passed out for inclusion in processing the next group of multiplier digits. Parity thru-checking is accomplished by logically summing all of the interstage carries together with the parity of the partial product and multiplicand terms and comparing this with the resultant partial product generated. Result parity must satisfy the equation:

Product Parity=Parity of Carries
⊕Parity of Partial Product⊕
(Parity of multiplicand·Number of multiplier bits is odd)

In the specific application where this part is used, two ranks of array chips are used to produce an iterative multiplier array which retires eight multiplier digits per clock cycle. Array width is set to handle 60-bit numbers, requiring sixteen array chips per rank (∅). Each half cycle produces a completed four bits of the product. A wired shift of four occurs between the ranks ∅1 and ∅3 to align the partial product for the next four-bit multiply operation. The multiplier is held in a pair of registers 118, and 156 wired to product a right shift of four 150 between ranks. As the product is formed, the four-bit completed products group are captured in these registers and shifted with the multiplier to assemble the final product.

In the actual implementation of the multiplier chip, operand sizes of 28, 36 and 60 bits had to be accommodated. Since eight bits of the multiplier are retired each clock cycle period, the times vary from 3½, 4½, to 7½ cycles of the clock. An extra half cycle is required to complete the final summation of the four-bit product terms with the carryout terms. A conventional carry lookahead network is incorporated between the first and second ranks. The multiplier is forced to zeros for this last half cycle accomplishing this last operation. The second rank drives a multiplexer to provide for proper alignment of the product dependent on product size.

This is shown in detail in FIG. 1. The multiplicand 152 is first sent to register 132 for later entry into multiplier registers 122 (∅1) and 112 (∅3). Concurrently, a 60 bit multiplier 154 is forwarded to the multiplier registers 156 (∅3) and 118 (∅1). Four bits of the ∅3 multiplier 156, shown as 128 is thereafter sent to the ∅1 multiplier register 122. The 4 bit product is subsequently reapplied in concatenation with a right shift signal R4, shown as 150, to the multiplier register 156. Error signals 110 and 120 are provided by parity thru checking and, as previously explained, is accomplished by the logical summation of all interstage carries together with the parity of the partial product. This sum is then compared with the final partial product generated. The error circuits 110 and 120 are comprised of parity trees of Exclusive OR circuits.

Error array detection is accomplished for each rank by logically summing each chip's product and carry parity terms with a term representing the multiplicand parity which is the multiplicand parity if an odd number of multiplier bits are ones, or zero if the bits are even. The overall logical sum must be zero to indicate correctness. A total of 77 terms must be summed to form the check which is done in conventional parity generators.

A conventional carry lookahead network 116 is connected between the ∅1 multiplier register 122 and the 4 bit portion 114 of the ∅3 multiplier register 112. This monitors the 4 bit content 114 of multiplier register 112 and informs the ∅1 multiplier register 122 of its contents. It is used on the last cycle of iteration.

Finally, a multiplexer 100 receives each of the partial products 136, 138 and 144. It properly aligns these partial products to produce a complete product 140.

Figure 2:
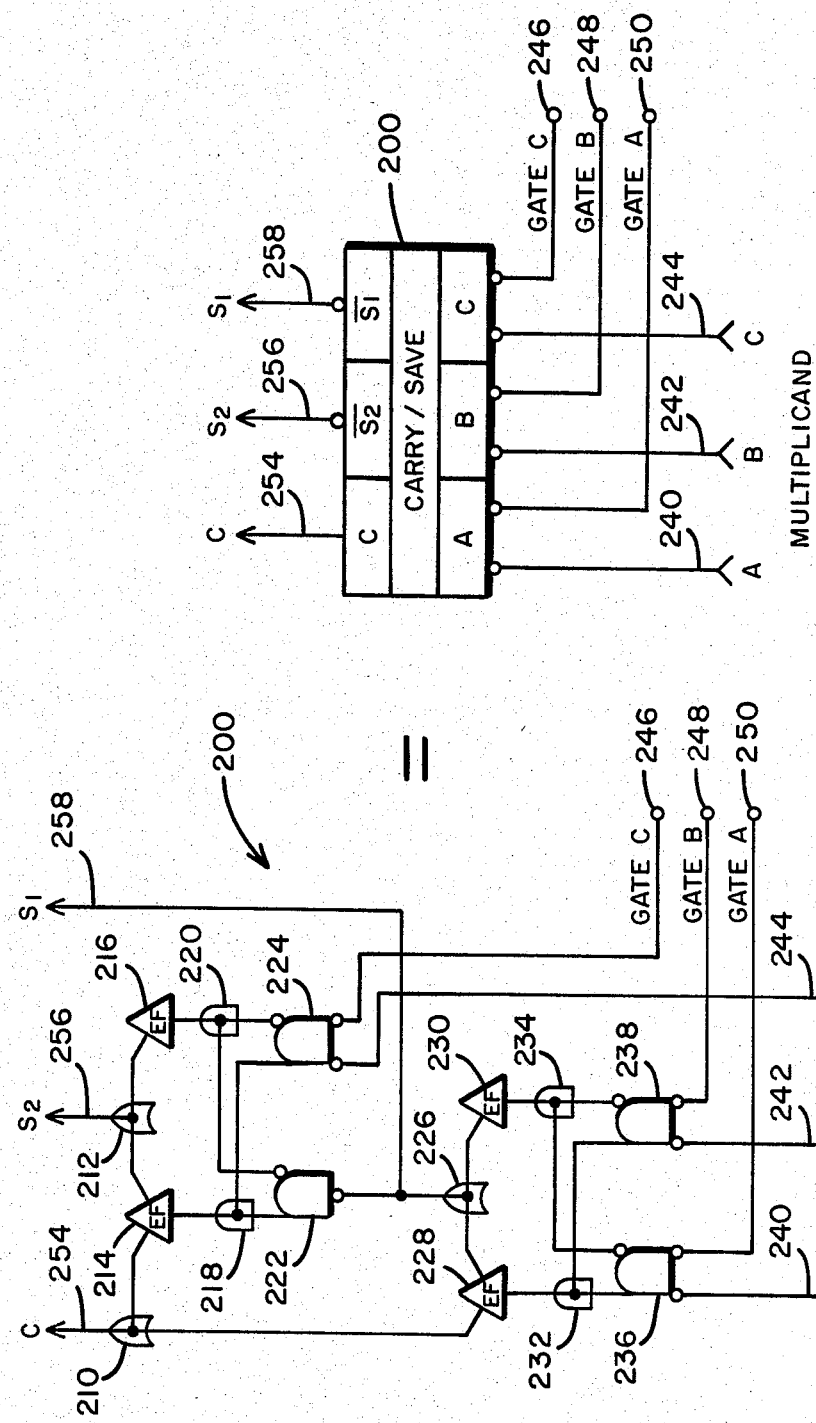
FIG. 2 shows a special circuit design which is used internal to the gate array to accomplish the array design. It demonstrates a three-input gated carry/save adder unit.

One special circuit configuration is used internal to the gate array to accomplish the array design and is shown in FIG. 2 which illustrates a three-input gated carry/save adder unit. Note that summing together of three binary numbers produces only a single carry out. The sum term is the equation $S = A + B + C$ and the carry term is $C = A \cdot B$ or $B \cdot C$ or $A \cdot C$. This is the basic unit of the carry/save array and is used in forms to accommodate logic data representation levels, i.e., depending on whether a high or a low signal implies a one. In one case the first level output is used dually to produce partial sum and carry parity detect. Returning to FIG. 2, the three inputs are shown in the logic schematic as 240, 242 and 244, while the gated inputs are shown as 246, 248 and 250. The single output sum 256 thus is the complement of the exclusively OR'd input signals A, B and C, noted as 240, 242 and 244. The output carry signal C is equal to the sum of the OR'd signals. If any group of two signals are ones (1) then a carry signal is provided. A pair of AND gates 236, 238 receive signals A and B of the multiplicand. They each provide a low and a high output signal. The circled signal output is the low output, while the uncircled outputs are the high output signals. This connotation applies throughout this specification and is applicable to input signals as well.

The low output signals from AND gates 236 and 238 are connected together and applied to OR gate 232, while the high signal outputs of these same AND gates are applied together to OR gate 234. It should be noted here that the center connection shown in each of the OR gates 232 and 234, as well as to any gates so shown, indicate a wired gate. The output signals from OR gates 232, 234 wired via emitter followers 228 and 230 to a exclusive OR gate 226. This interconnection of AND and OR gates is repeated in the upper portion of the figure by AND gates 222, 224, OR gates 218, 220 emitter follwers 214, 216 and exclusive OR gate 212. The carry output signal 254 is obtained as a second output from each of the emitter followers 210 and 228 which second outputs are gated together by exclusive OR gate 210. The right hand portion of FIG. 2 is the block symbol 200 of the logic schematic shown on the left hand side. For the sake of clarity, this block symbol will hereafter be used to symbolize this gated carry/save adder.

FIG. 3 diagrams the carry/save array interconnect. Generally, multiplicands and multiplier inputs are buffered by inverters to produce both fanout and logical inversion. A further feature of the design forms the parity of the multiplier bits which is compared with other chips in the matrix and the original source multiplier. All chips must be equal to indicate correctness. The output of the carry/save array is presented in logical sum and carry terms to a conventional full adder for final summing. Partial parity terms are generated for the formation of predicted parity. Carries out 350 of the left most stage of the array are interconnected with the next adjacent chips/carry inputs 360 are shown on the right.

As presented in FIG. 3, a plurality of the carry/save adders 200 are placed in array form. The inverters 312, 314, 316, 318, 320, 322 and 324 are connected to the multiplicand input lines M+3, M+2, M+1, M, M−1, M−2, and M−3. Similarly inverters 326, 328, 330 and 332 are connected to the four input multiplier lines X3, X2, X1 and X0, to provide 1x, 2x, 4x and 8x input signals to the respective carry/save adders 200.

Concurrently therewith, the inverted multiplier signals are gated together by the parity AND gate 310 to provide the partial multiplier parity. The signals from the bottom level of carry/save address are applied to the second and third levels as shown, with the outputs from the second level also applied to the third level of carry/save adders 200. Through the interconnection shown, the output signals from the earlier levels sequentially ripple through subsequent levels to provide carry/save outputs N, N+1, N+2, and N+3. Also the carry inputs 360 from the earlier sequence are blended with the final level of carry/save adders of the array to provide their outputs to this array. The carry output signals 350 are individually taken on the leftmost carry/save adder of each of the levels of the array.

FIG. 4 is the full adder which sums together the logical sum and carry terms of the carry/save network to produce a four-bit product and single carry term. The adder consists of two half-add ranks with a partial carry lookahead network. Carries in the adder are summed logically to be incorporated into predicted parity. Provision is made for external carries for an intergroup carry lookahead network.

Illustrated therein is a conventional adder 410. Such adders are well-known in the art and will not be further described herein. It receives from the carry/save array a group of four sum signals 418 and a group of four carry signals 420. It also receives as a carry-in signal a group of carry-in terms. These carry-in terms include 428, 430, 432, 434 signals which are gated together by AND gate 424. Carry-in term 426 from the previous array is then gated together by exclusive OR gate 422 with the output from AND gate 422 to provide the carry in term to the adder 410.

The output signals from the full adder 410 include the group carry generate signal 412, the four adder carry signals 414 and the four sum signals 416.

FIG. 5 is the Product latch logic which captures the product, carry out and carry-parity term. The register drives the external world presenting the product, carry, carry propagate (all product bits=ones), and parity of detected carries. Provision is made for initial clearing of the latches for initialization.

There is shown a plurality of six latching circuits 510, 512, 514, 516, 518 and 520. These are commonly called latches and are so called throughout the remainder of this specification. A latch may also be referred to as a flip-flop however, there is a slight operational difference. They will not be described further in this application because they are conventional and their description and operation are well known to those skilled in the art to which this invention pertains.

Each of the latches 510–520 has a plurality of input terminals which include a Reset terminal R, a clock terminal C and an actuating terminal D. Each latch also provides an output signal Q as well as it's complement $\bar{Q}$. The four latch circuits 514, 516, 518 and 520 taken together receive the output signals from the adder circuit of FIG. 4 and provide the output product from their combined output terminals. The latch circuit 512 is the parity latching circuit. It receives a parity signal from the parity circuit 522. This circuit is an exclusive OR gate tree which, in turn receives a group of four adder carry signals from the adder. Further, a group of three signals and a group of seven signals are also received by the parity AND gate. The group of three signals include the C0, C1, C2 carry output signals from the carry/save array of FIG. 3, while the group of seven signals comprise four signals which are the PCN, PC (N+1), PC(N+2) and PC(N+3) also from the carry/save array and three signals $C_N$, $C_{(N+1)}$ and $C_{(N+2)}$. The sixth latch circuit 510 receives the adder carry signal from the adder circuit of FIG. 4 and provides a carry generate signal CG and its complement $\overline{CG}$.

The four latches 514, 516, 518 and 520 have their respective output signals Q gated together through AND gate 528 to generate a carry propagate signal $\overline{CP}$.

FIG. 6 is a simplified logic diagram of the system showing the carry/save adder array 300 of FIG. 3, the adder 410 of FIG. 4 and the latch circuit registers of FIG. 5. Thus in FIG. 6, the carry/save add array 300 receives the input multiplicand via four AND gates 616, 618, 620 and 622. The multiplier input of 4 bits is also applied to these same AND gates. The multiplier input is also applied to the parity network 310 to provide the parity of the multiplier digit. Four of the carry lookahead signals are received by an AND gate 614, the output of which is or'd together with the remaining carry lookahead signal in OR gate 612. Thereafter, the carry in signal is applied to the four bit full adder 410 and the carry parity network 522. The inter-stage carry is also applied to the carry parity network 522, as are the four parity carry signals from the carry/save add array 300. Four partial product input signals are also sent to the carry/save add array 300 for inclusion in that computation by the adder. A pair of interstage carries are sent from the carry/save adder 300 to provide the interstage carry out signals. The six latch circuits 510, 512, 514, 516, 518, 520 of FIG. 5 are shown in their appropriate location in the overall system across the top of FIG. 6. The four latch circuits 514, 516, 518 and 520 individually receive the 4 bit sum from the adder 410 and they, in turn provide the four bit partial product output. These same four bits of the partial product are gated together in AND gate 528 to provide the carry lookahead/carry propogate output signal. The remaining two latch circuits 510 and 512 are the carry parity latch and the carry output latch respectively of the multiplier array.

Referring again to FIG. 6, it is necessary to combine the parity of one carries 522 of an exclusive OR gate with the parity of the partial product (shown at the bottom of the figure). This is then exclusive OR'd with the parity of the multiplicand input. They are AND'd together. If we have an odd parity at this multiplier digit, we include the parity of the multiplicand, otherwise it is not entered in. This is so because when you are multiplying by an even number of bits, the parity of the multiplicand is always even. The final product parity that we come out with at any given step of the iteration must satisfy that equation or we have an error in the array. The multiplicand parity, of course, comes off the multiplicand register and the multiplier digit parity for each four bit digit is also easily obtained, since it is generated right in the chip. The multiplier parity is just a rank of exclusive OR gates. This serves two purposes, one purpose is the determination of the parity of the four bit group so that the final product parity may be computed. The second purpose is the comparison of the multiplier parity of the chip with the same signal from adjacent chips in the array to determine whether each chip is seeing the same multiplier digit. This, it is seen gives a further error check. The carry parities are taken off of the respective arrays 300, so we have the signal PC (a parity of carries). These are the signals $PC(n)$, $PC(n+1)$ and $PC(n+3)$. This is the parity of all the carries that have occurred on all of the array. It comes off on a per bit basis and is taken off of the $S_1$ output terminal of each of the networks. It thus gives us the parity of the carries that have occurred in the network.

It should be noted for emphasis that this is a four by four bit unit that we are looking at. We actually use this to build up a 60 bit wide unit. So the carries come off each chip and they are connected to the same terminal of the next adjacent chip up as the carry input to that next chip. Thus, it is seen that this continues until you build up the entire array.

Referring now to FIG. 7, which is comprised of FIGS. 7A, 7B, 7C and 7D positioned as shown, there is illustrated a complete logic diagram of the carry/save network. Of course, it would be unduly complicated to illustrate the entire 60 bit array, so what is shown is a four x four bit unit which may be interconnected as previously described.

Usually, in drawing logic diagrams one would not show an exclusive OR gate as it is illustrated in this figure. Rather one would draw it as a single gate. In one present logic illustration it is created from a group of gates. Thus, AND gates 236, 238, together with OR gates 232, 234 (which are shown as direct wired gates), emitter followers 228 and 230 create a single exclusive OR gate. What is shown is the basic logic gates as they are actually implemented. Since this is a four by four matrix, four gate levels are shown in the dotted line area shown along the right column of the matrix. This is repeated four times across the figure, with each dashed area showing four gates to provide the complete four x four array. The gating elements are shown across the bottom of the figure.

FIG. 7 illustrates the sum terms and the carry terms on a per bit basis. These have to be further added together to form the true partial product. For this addition, it uses a simple adder of ordinary design. This is shown in FIG. 8. It is really just a basic conventional adder that adds the sums and the overall carries together. It is believed that it does not require further description. It also shows a loop of the parity carries wherein they are formed up. Also included is the carry input terminal network which enables it to be tied in with the previous carry lookahead network. It should be noted that FIG. 8 is also comprised of FIGS. 8A, 8B, 8C and 8D positioned as shown.

Now, the output of the adder of FIG. 8 goes into a series of latches illustrated in FIG. 9. Again FIG. 9 is comprised of FIGS. 9A, 9B, 9C and 9D positioned as illustrated. In addition to the output from the adder which are signal lines $\overline{ADD0}$, $\overline{ADD1}$, $\overline{ADD2}$ and $\overline{ADD3}$, we have all of the parity terms which we have been discussing. The parity of the carries is accumulated here. The parity network is nothing more than an exclusive OR tree network. For the sake of simplicity, we did not include it here, but we also monitor interstage carries in the adder unit of FIG. 8.

In addition, adder carries (C0 to C3 terms) from the carry/save array of FIG. 7 are included in the input term to the latch circuit register of FIG. 9. There are also carries that enter the latch register. These are the carry 1, carry 2, carry 3 terms from the carry/save array of FIG. 7. These are all brought into the latch register. As a point of clarity here, the latches mentioned are almost universally called flip/flops. However, as previously noted strictly speaking there is a difference between a flip/flop and a latch. A flip/flop operates on clock signal edges, whereas, a latch circuit operates on the entire clock pulse. However, latches are well known circuits in the art and will not be further described.

We also take the carry that was generated out of the adder circuit and latch it as well. Essentially, we are capturing a group of four bits and this is the carry that was generated by that group of four bits. Ultimately, that will be used in the carry lookahead unit to produce a proper carry for the array.

There are two ranks of six latches each across the FIG. 9. This is really a shift register network built up with two ranks of latches. In actual operation of the array we come through and latch up one of the ranks of multipliers. This is then fed into the next rank of the multiplier where we do the next four bits. So, the output partial product terminals are feeding into the partial product inputs of the next rank and that in turn feeds back into the first array. So there is a bouncing back and forth between the ranks. These two latch circuit ranks are illustrated generally in FIG. 9 as 900 and 950. In rank 900, there is included a plurality of six latching circuits 910, 912, 914, 916, 918 and 920. The respective outputs from each of these circuits are fed back to the inputs of the second rank 950. Included in this second rank and latch circuits 930, 932, 934, 936, 938 and 940. Latch circuit 930 provides the parity output, latch circuit 932 provides the carry signal output, while the remaining four latch circuits accomodate the four adder bits $\overline{ADD0}$, $\overline{ADD1}$, $\overline{ADD2}$, and $\overline{ADD3}$ to provide the four product bits PROD 0, PROD 1, PROD 2, and PROD 3. In the upper left hand portion of the FIG. 9, there is shown AND gate 942 wherein the four product out bits are AND's together to provide the carry propagate signal PROPAGATE. This says that if a carry was generated into this four bit group, the term was not satisifed and it has to be propagated until the next CG signal is carry generated.

The twin AND gates 944, 946 down in the lower left of the FIG. 9 are the clock and reset signals of the latch register. Finally, the pair of phase signals ØA and ØB are coupled into the ranks 900, 910 of latching circuits for alternate operation of the ranks.

It is believed that one of the unique features of this multiplier is its use of the gated exclusive OR gate or carry/save network provided by the circuit of FIG. 2. It is noted that most multiply algorithms are carried out by requiring that the multiplier digits be translated prior to their application to the network. They use combinations of multiplexers and carry/save adders. The present invention really builds the multiplexer right into the carry/save adder and does not require any translation of the multiplier digits. They are applied directly to the selector controls of the carry/save network. Further, in most multiply algorithms there is not a three times multiply. Instead, they will subtract four times at one level and then add one level. Or they will add four times at one level and subtract one the next time or some combination of these examples. The present invention directly produces the three times operation as well as the five and some other combinations.

In conclusion, the specialized networks which most contemporary large scale processors use as multipliers to provide faster multiply operations were usually designed to simultaneously process several multiplier bits. A number of specialized algorithms have been developed to simplify the logic in building these arrays and generally involve decoding of multiplier groups and interaction between multiplier groups to control the array. This, of course, complicates the control aspect while simplifying the array. Such arrays are commonly built of a combination of Adders (either in carry/save form or conventional in nature), multiplexers, and multiplier decoders for control. A second common feature of contemporary processors is the inclusion of error detecting networks in all data paths of the machine. Contemporary LSI devices do not provide for error detection, leaving duplication and result comparison as the only available method with these parts. This disclosure describes a system which eliminates multiplier decoding with no significant increase in array complexity and incorporates parity thru checking. Design is directed toward LSI implementation in gate array technology and may be implemented as a full matrix design or operated in an iterative manner processing four multiplier digits per step. The uniqueness of the array derives from the use of the gated carry/save network, eliminating the need for decoding of the multiplier bits. While the array proper is more complex than other multibit algorithms, no multiplexers needed by other systems are required, and no decoding of the multiplier bits or interaction between multiplier groups is required. The net effect is a reduction in logic with faster operation because of no decoding. Error detection is also accomplished in the design. The carry/save array is not limited to four bits per step as illustrated in the preferred array, in fact, as many as nine bits per step have been accomplished.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A fast, error checked multibit multiplier to provide increased performance for the multiply operations of a large scale data processor by processing a plurality of bits per machine cycle comprising:
   (a) a multiplicand register connected to receive the multiplicand;
   (b) a first and a second multiplier array each connected to said multiplicand register to receive therefrom the contents of said multiplicand register; said first and second multiplier arrays being further iteratively interconnected such that the output of the second multiplier array is connected to the input of the first array;
   (c) a first and a second multiplier register iteratively interconnected such that the output of said first multiplier register is connected to the input of the second and the output of the second is connected to the input of the first;
   (d) said first and second multiplier arrays and said first and second multiplier registers further interconnected one to another such that a portion of said first multiplier array is connected to the input of the first multiplier register and a portion of said second multiplier array is connected to the input of said second multiplier register,
   (e) a multiple phase activating source connected to said first and second multiplier arrays and to said first and second multiplier registers such that said first multiplier array and said second multiplier register are simultaneously actuated during one phase and said second multiplier array and said first multiplier register are simultaneously actuated during another;
   (f) a first multiplier control means connected between said first multiplier array and said first multiplier register such that a portion of the output of the first multiplier register is used to control said first multiplier array;
   (g) a second multiplier control means connected between said second multiplier array and said second multiplier register such that a portion of the output of said second multiplier register is used to control said second multiplier array; and
   (h) a multiplexing and aligning means connected to sequentially receive portions of product output signals from said second multiplier array and portions of product output signals from said first multiplier register and to properly align said portions into a complete product.

2. A fast, error checked multibit multiplier to provide increased performance for the multiply operations of a large scale data processor by processing a plurality of bits per machine cycle comprising:
(a) a multiplicand register connected to receive the multiplicand;
(b) first and second multiplier arrays, each connected to said multiplicand register to receive therefrom the contents of said multiplicand register, said first and second multiplier arrays being serially interconnected such that the output of said second multiplier array is connected to the input of said first multiplier array;
(c) a first and a second multiplier register iteratively interconnected such that the output of said first multiplier register is connected to the input of said second multiplier register and the output of said second multiplier register is connected to the input of said first multiplier register;
(d) said first and second multiplier arrays and said first and second multiplier registers further interconnected one to another such that a portion of said first multiplier array is connected to the input of said first multiplier register and a portion of said second multiplier array is connected to the input of said second multiplier register;
(e) a multiple phase activating source connected to said first and second multiplier arrays and to said first and second multiplier registers such that said first multiplier array and said second multiplier registers are simultaneously actuated during one phase and said second multiplier array and said first multiplier register are simultaneously actuated during another phase;
(f) first multiplier control means connected between said first multiplier array and said first multiplier register such that a portion of the output of the first multiplier register is used to control said first multiplier array;
(g) second multiplier control means connected between said second multiplier array and said second multiplier register such that a portion of the output of said second multiplier register is used to control said second multiplier array; and
(h) multiplexing and aligning means connected to sequentially receive portions of product output signals from said second multiplier array and portions of product output signals from said first multiplier register and to properly align said portions into a complete product.

3. The invention as set forth in claim 2 wherein each of said first and second multiplier arrays is created from a plurality of multiple input gated carry/save logic circuits.

* * * * *